United States Patent
Jayapaul et al.

(10) Patent No.: US 10,198,275 B2
(45) Date of Patent: Feb. 5, 2019

(54) PROTECTING FIRMWARE FLASHING FROM POWER OPERATIONS

(71) Applicant: AMERICAN MEGATRENDS, INC., Norcross, GA (US)

(72) Inventors: Pravinash Jayapaul, Chennai (IN); Venkatesan Balakrishnan, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 224 days.

(21) Appl. No.: 15/169,143

(22) Filed: May 31, 2016

(65) Prior Publication Data
US 2017/0344360 A1 Nov. 30, 2017

(51) Int. Cl.
G06F 13/22 (2006.01)
G06F 11/00 (2006.01)
G06F 9/4401 (2018.01)
G06F 9/48 (2006.01)
G06F 13/24 (2006.01)
G06F 8/654 (2018.01)

(52) U.S. Cl.
CPC ............. *G06F 9/442* (2013.01); *G06F 8/654* (2018.02); *G06F 9/4406* (2013.01); *G06F 9/4812* (2013.01); *G06F 13/24* (2013.01)

(58) Field of Classification Search
None
See application file for complete search history.

(56) References Cited

U.S. PATENT DOCUMENTS

| 9,355,050 | B2* | 5/2016 | Zeng | G06F 13/26 |
| 2007/0220372 | A1* | 9/2007 | Chen | G06F 8/65 |
| | | | | 714/52 |
| 2010/0030939 | A1* | 2/2010 | Litovtchenko | G06F 9/4812 |
| | | | | 710/263 |
| 2010/0241771 | A1* | 9/2010 | Nagai | G06F 13/24 |
| | | | | 710/52 |
| 2011/0181309 | A1* | 7/2011 | Morita | G01R 31/31907 |
| | | | | 324/750.3 |

OTHER PUBLICATIONS

Intelligent Platform Management, Oct. 1, 2013, Intel, v2.0.*
Firmware Updating Procedure for RX-V771, Dec. 10, 2011, Yamaha.*

* cited by examiner

*Primary Examiner* — Hyun Nam
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a management device. The apparatus may be a management device. The management device receives a first command. The management device determines whether the management device is in a protected mode for executing a protected process. The management device, in response to a determination that the management device is in the protected mode, determines whether the first command, when executed, interrupts the execution of the protected process. The management device, in response to a determination that the first command interrupts the execution of the protected process, discards the first command.

16 Claims, 4 Drawing Sheets

PROTECTING FIRMWARE FLASHING FROM POWER OPERATIONS

BACKGROUND

Field

The present disclosure relates generally to computer management devices, and more particularly, to techniques of protecting a firmware flashing process performed by a baseboard management controller (BMC) from power operations of the BMC or of a host computer managed by the BMC.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, Simple Network Management Protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, PROM, EPROM, EEPROM, etc. There is a need to protect a firmware flashing process performed by a BMC from power operations of the BMC or of a host computer managed by the BMC.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a management device. The management device receives a first command. The management device determines whether the management device is in a protected mode for executing a protected process. The management device, in response to a determination that the management device is in the protected mode, determines whether the first command, when executed, interrupts the execution of the protected process. The management device, in response to a determination that the first command interrupts the execution of the protected process, discards the first command.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
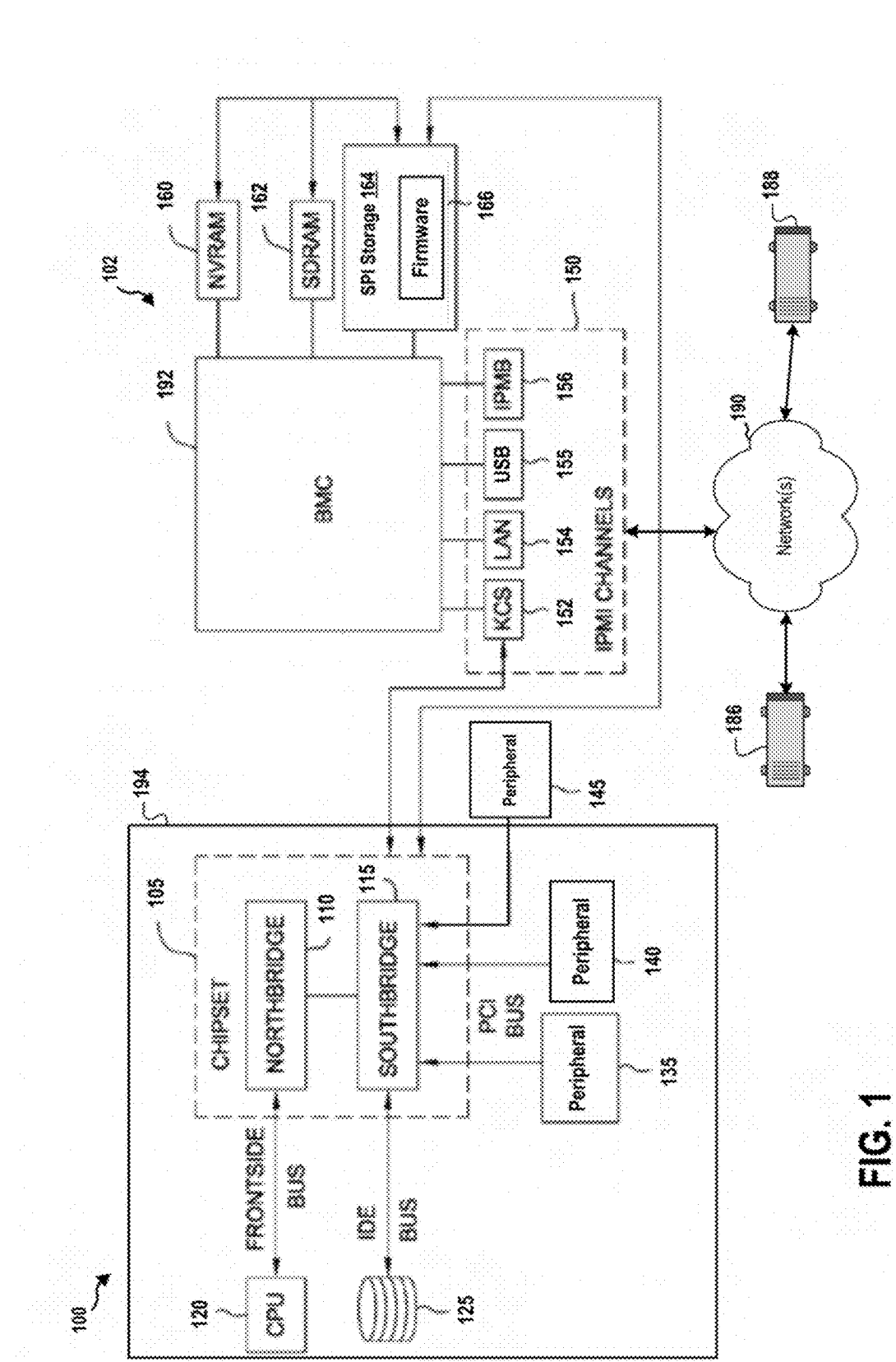
FIG. 1 is a diagram 100 illustrating a BMC and a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

BMCs play a major role in enterprise server management. For example, a BMC can upgrade basic input/output systems (BIOSes) of host computers managed by the BMC as well as firmware of peripherals of the host computers such as a power supply unit (PSU), a complex programmable logic device (CPLD), a baseband unit (BBU), etc. The uptime of the BMCs is important for server management and monitoring. From time to time, the system firmware of a BMC may need to be upgraded in the field for bug fixes and/or enhanced functionalities. The system firmware of a BMC may be stored in a serial peripheral interface (SPI) storage device or other storage devices on the BMC. A storage device may be flashed with the updated firmware. When the system firmware of the BMC is being upgraded from the host computer (e.g., through a keyboard control style (KCS) interface/channel or a Universal Serial Bus (USB) interface/channel), if the host computer is powered off during the upgrade, the flash will be corrupted. The damage may be more serious, when the primary image itself is getting flashed in the field or the BMC has only one storage device (e.g., a SPI storage device) to hold the firmware image. Similarly, the firmware of the one or more peripherals may need to be flashed by the BMC. Accordingly, there is a need to protect the BMC firmware or the peripheral firmware from damages caused by power operations during the flash.

FIG. 1 is a diagram 100 illustrating a computer system. As shown, a system 102 includes a host computer 194 and a BMC 192 managing the host computer 194. The host computer 194 includes a chipset 105, a processor 120, storage devices 125, and peripherals 135, 140, 145. Illustratively, the chipset 105 includes a northbridge 110 connected to the processor 120 over a front side bus. The processor 120 is included to be representative of a single CPU, multiple CPUs, a single CPU having multiple processing cores, and the like. The chipset 105 also includes a southbridge 115 connected to the storage devices 125. The storage devices 125 may store application programs and data for use by the system 102. Examples of storage devices 125 include one or more hard-disk drives, optical media and the like. Southbridge 115 may also be connected to the peripherals 135, 140, 145. The peripherals 135, 140, 145 may include one or more of a PSU, a CPLD, a BBU, and a BIOS chip storing an image of a BIOS program.

The BMC 192 includes a non-volatile memory 160, a volatile memory 162, and a SPI storage device 164. In this embodiment, the SPI storage device 164 is for storing the firmware 166. As shown, the BMC 192 may support IPMI channels 150, which include one or more of a KCS channel 152, a local area network (LAN) channel 154, a USB interface 155, and an IPMB (Intelligent Platform Management Bus) channel 156. Thus, any of the channels 150 may be used to communicate with the BMC 192 according to the IPMI standard. The chipset 105 may also be connected to IPMI channels used to communicate with the BMC 192.

As described supra, the BMC 192 may store an image of a current version of the system firmware in the SPI storage device 164. In a first scenario, the BMC may receive an image of an updated version of the system firmware from the host computer 194 or from a file server 186 through a network 190. The BMC 192 may initially temporally place the image of the updated version in the volatile memory 162. Then the BMC 192 executes a procedure to flash the SPI storage device 164 with the image of the updated version.

In a second scenario, the BMC may receive images of an updated version of peripheral firmware of one or more of peripherals 135, 140, 145 from the host computer 194 or from the file server 186 (or another remote device) through the network 190. Similarly, the BMC 192 may initially temporally place the image of the updated version in the volatile memory 162. Then the BMC 192 executes a procedure to flash the one or more peripherals 135, 140, 145 with the images of the updated version. In certain configurations, when flashing the peripherals 135, 140, 145, the BMC 192 may transmit data or commands to, or receive data or commands from, the host computer 194 through a system interface (e.g., the KCS interface 152 or the USB interface 155) between the host computer 194 or the BMC 192.

When the BMC 192 is flashing the system firmware or the peripheral firmware or is communicating with the host computer 194 as described supra, the BMC 192 may be considered as operating in a protected mode to execute a protected process.

Figure 2:
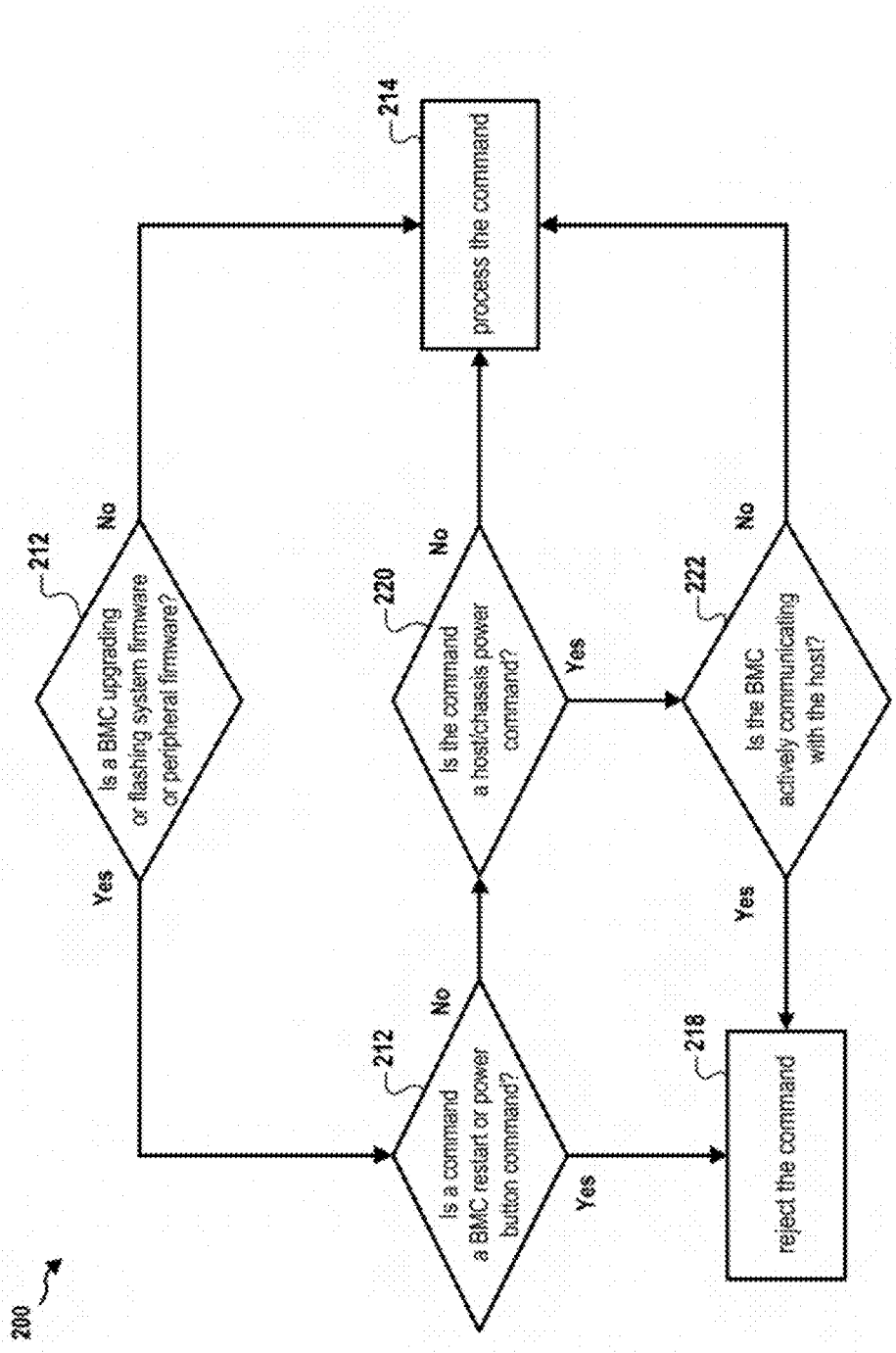
FIG. 2 is a flow chart 200 of a method (process) for protecting firmware flashing from power operations.

FIG. 2 is a flow chart 200 of a method (process) for protecting firmware flashing from power operations. The method may be performed by the BMC 192 or another management device (e.g., the apparatus 302/302').

The BMC 192 may receive an IPMI command from the host computer 194 through a system interface or from a remote device 188 through the network 190. In particular, the BMC 192 may receive the IPMI command from the host computer 194 through the KCS interface 152 or the USB interface 155. The BMC 192 may receive the IPMI command from the remote device through the LAN interface 158. For example, an IPMI application may run on the host computer 194 or the remote device 188 and may generate the IPMI command. The IPMI command may be generated in response to a user input.

Upon receiving the IPMI command, the BMC 192 may, at operation 212, determine whether the BMC 192 is upgrading or flashing the system firmware or the peripheral firmware as described supra. In particular, the BMC 192 determines whether the system firmware in the SPI storage device 164 is being flashed. The BMC 192 may also determines whether the firmware the peripherals 135, 140, 145 (e.g., a PSU, a CPLD, a BBU, and/or a BIOS chip, etc.) is being flashed. When the BMC 192 is not flashing the system firmware or the peripheral firmware, the BMC 192 may enter operation 214, in which the BMC 192 continues executing the IPMI command. For example, the IPMI command may be passed to an IPMI stack for processing.

When the BMC 192 is flashing the system firmware or the peripheral firmware, i.e., the BMC 192 is in a protected mode and executing a protected process, the BMC 192 then determines whether executing the IPMI command would interrupt the execution of the protected process. In particular, as an example, the BMC 192 may initially determines, at operation 216, whether the IPMI command is a restart command or a power button command directed to the BMC 192. In particular, the BMC 192 may determine whether the IPMI command requests the BMC 192 to power off, power cycle, shut down, restart or perform other power functions. When the BMC 192 determines that the IPMI command is a restart command or a power button command, the BMC 192 then, at operation 218, rejects or discards the IPMI command and may send a response to the host computer 194 or the remote device 188 that sent the IPMI command, indicating that the IPMI command has been rejected. In other words, the BMC 192 keeps the current state of the BMC system and will not allow any change in the power state of the BMC 192 and the host computer 194.

When the BMC 192 determines that the IPMI command is not a restart command or a power button command directed the BMC 192 (e.g., the IPMI command does not request the BMC 192 to power off, power cycle, shut down, or restart), the BMC 192 then, at operation 220, determines whether the IPMI command is a host power command directed to the host computer 194, which is managed by the BMC 192. In particular, the BMC 192 may determine whether the IPMI command requests the host computer 194 or the chassis of the host computer 194 to power off, power cycle, shut down, restart or perform other power functions. When the IPMI command is not a host power command directed to the host computer 194, the BMC 192 enters operation 214.

When the IPMI command is a host power command directed to the host computer 194, the BMC 192 determines, at operation 222, whether the BMC is actively communicating with the host. In particular, the BMC 192 may determine whether a communication interface (e.g., the KCS interface 152, the USB interface 155) between the BMC 192 and the host computer 194 is in use. The IPMI command is determined to interrupt the execution of the protected process when the BMC 192 is actively communicating with the host. Accordingly, when the BMC 192 is actively communicating with the host computer 194, the BMC 192 enters operation 218. When the BMC is not actively communicating with the host, the BMC 192 enters operation 214.

Figure 3:
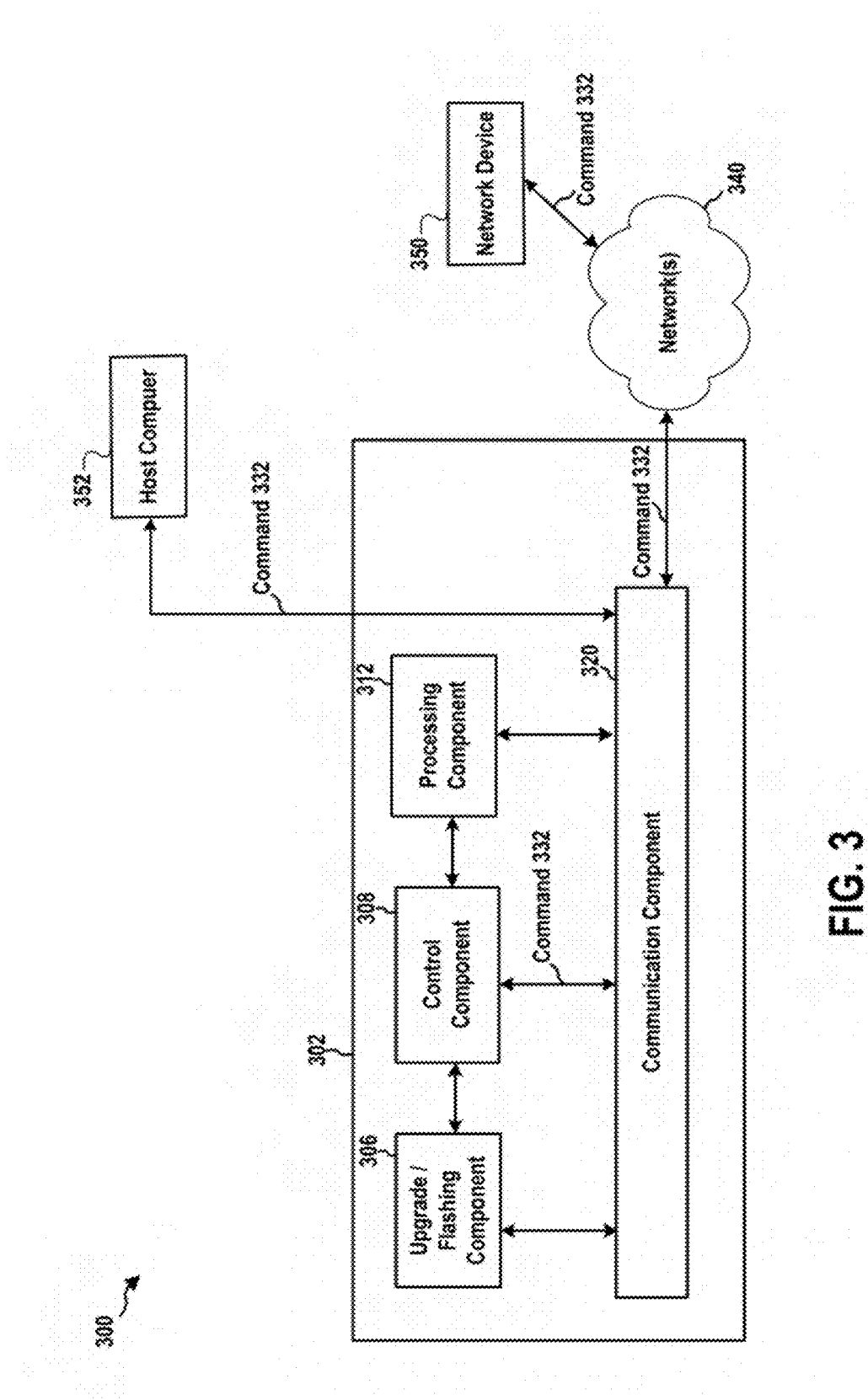
FIG. 3 is a conceptual data flow diagram illustrating the data flow between different means/components in an exemplary apparatus.

FIG. 3 is a conceptual data flow diagram 300 illustrating the data flow between different components/means in an exemplary apparatus 302. The apparatus 302 may be a management device (e.g., the BMC 192). The apparatus 302 includes, among other components, an upgrading/flashing component 306, a control component 308, an IPMI processing component 312, and a communication component 320. The apparatus 302 may be in communication with, through one or more networks 340, a network device 350.

The communication component 320 receives a command 332, which is then passed to the control component 308. The command 332 may be received through an intelligent platform management interface (IPMI) channel. In certain configurations, the command 332 may be received from an IPMI client on a host computer 352 managed by the apparatus 302. In certain configurations, the command 332 may be received from, through the one or more networks 340, an IPMI client on the network device 350. The control component 308 determines whether the apparatus 302 is in a protected mode for executing a protected process. When the apparatus 302 is in the protected mode, the control component 308 determines whether the command 332, when executed, interrupts the execution of the protected process. When the command 332 interrupts the execution of the protected process, the control component 308 discards the command 332.

The control component 308 may be configured to determine that the apparatus 302 is in the protected mode when the upgrading/flashing component 306 is upgrading firmware of the apparatus 302. The control component 308 may be configured to determine that the apparatus 302 is in the protected mode when the upgrading/flashing component 306 is upgrading firmware of one or more peripherals of the host computer 352 managed by the apparatus 302. In certain configurations, the one or more peripherals include at least one of a power supply unit (PSU), a complex programmable logic device (CPLD), a baseband unit (BBU), and a basic input/output system (BIOS). When the command 332 does not interrupt the execution of the protected process, the IPMI processing component 312 executes the command 332.

In certain configurations, the command 332 is determined to interrupt the execution of the protected process when the command 332 is a restart command or a power button command of the apparatus 302. In certain configurations, the power button command of the apparatus 302 instructs the apparatus 302 to power off, to power cycle, or to shutdown.

In certain configurations, to determine whether the command 332 interrupts the execution of the protected process, the control component 308 determines whether the command 332 is a host power command directed to the host computer 352. When the command 332 is a host power command directed to the host computer 352, the control component 308 determines whether the communication component 320 is actively communicating with the host computer 352. The command 332 is determined to interrupt the execution of the protected process when the communication component 320 is actively communicating with the host computer 352. The command 332 is determined to not interrupt the execution of the protected process when the communication component 320 is not actively communicating with the host computer 352.

In certain configurations, to determine whether the communication component 320 is actively communicating with the host computer 352, the control component 308 determines whether a communication interface of the communication component 320 between the apparatus 302 and the host computer 352 is in use. In certain configurations, the communication interface is a keyboard controller style (KCS) interface or a universal serial bus (USB) interface.

Figure 4:
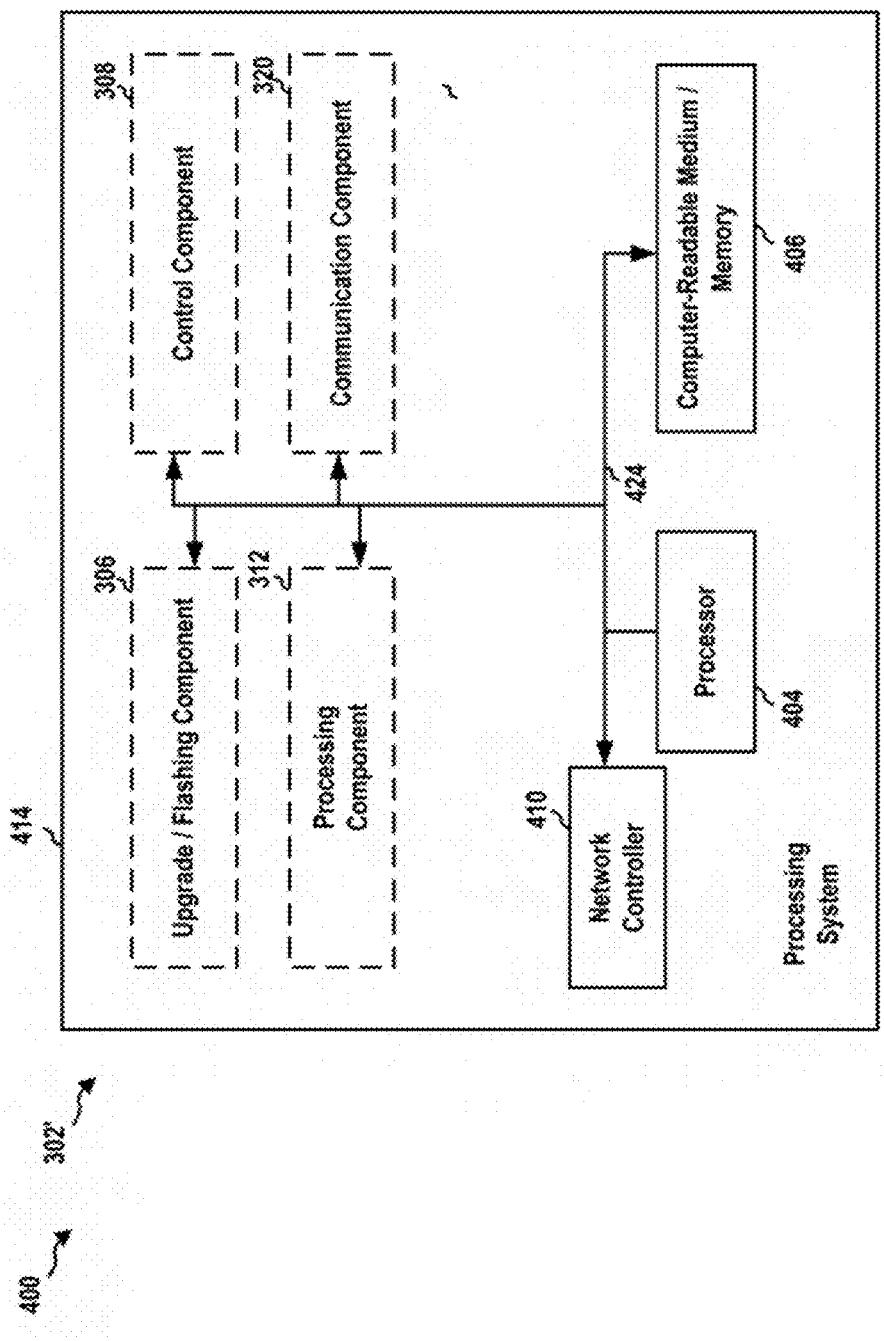
FIG. 4 is a diagram illustrating an example of a hardware implementation for an apparatus employing a processing system.

FIG. 4 is a diagram 400 illustrating an example of a hardware implementation for an apparatus 302' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the components 306, 308, 312, 320, and the computer-readable medium/memory 406. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically the communication component 320. In addition, the network controller 410 receives information from the processing system 414, specifically the communication component 320, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the components 306, 308, 312, 320. The components may be software components running in the processor 404, resident/stored in the computer readable medium/memory 406, one or more hardware components coupled to the processor 404, or some combination thereof.

The apparatus 302/302' may be configured to include means for performing each of the operations described supra referring to FIG. 2. The aforementioned means may be one or more of the aforementioned components of the apparatus 302 and/or the processing system 414 of the apparatus 302' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:
   receiving a first command;
   determining whether the BMC is in a protected mode for executing a protected process, wherein the protected process is updating firmware of the BMC;
   in response to a determination that the BMC is in the protected mode, determining whether the first command, when executed, interrupts the execution of the protected process, including:
      determining that the first command is a host power command directed to a host computer managed by the BMC; and
      determining whether the BMC is actively communicating with the host computer, wherein the first command is determined to interrupt the execution of the protected process when the BMC is actively communicating with the host computer; and
   in response to a determination that the first command interrupts the execution of the protected process, discarding the first command.

2. The method of claim 1, further comprising:
   determining that the BMC is in the protected mode when the BMC is upgrading firmware of one or more peripherals of a host computer managed by the BMC.

3. The method of claim 2, wherein the one or more peripherals include at least one of a power supply unit (PSU), a complex programmable logic device (CPLD), a baseband unit (BBU), and a basic input/output system (BIOS).

4. The method of claim 1, further comprising:
   in response to a determination that the first command does not interrupt the execution of the protected process, executing the first command.

5. The method of claim 1, wherein the first command is determined to interrupt the execution of the protected process when the first command is a restart command or a power button command of the BMC.

6. The method of claim 4, wherein the power button command of the BMC instructs the BMC to power off, to power cycle, or to shutdown.

7. The method of claim 1, wherein the first command is determined to not interrupt the execution of the protected process when the BMC is not actively communicating with the host.

8. The method of claim 1, wherein the determining whether the BMC is actively communicating with the host includes determining whether a communication interface between the BMC and the host is in use.

9. The method of claim 8, wherein the communication interface is a keyboard controller style (KCS) interface or a universal serial bus (USB) interface.

10. The method of claim 1, wherein the first command is received through an intelligent platform management interface (IPMI) channel.

11. The method of claim 10, wherein the first command is received from an IPMI client on a host managed by the BMC.

12. The method of claim 10, wherein the first command is received from an IPMI client on a remote machine.

13. An apparatus, the apparatus being a baseboard management controller (BMC), comprising:
   a memory; and
   at least one processor coupled to the memory and configured to:
      receive a first command;
      determine whether the BMC is in a protected mode for executing a protected process, wherein the protected process is updating firmware of the BMC;
      in response to a determination that the BMC is in the protected mode, determine whether the first command, when executed, interrupts the execution of the protected process, wherein to determine whether the first command interrupts, the at least one processor is further configured to:
      determine that the first command is a host power command directed to a host computer managed by the BMC; and
      determine whether the BMC is actively communicating with the host computer, wherein the first command is determined to interrupt the execution of the protected process when the BMC is actively communicating with the host computer; and
      in response to a determination that the first command interrupts the execution of the protected process, discard the first command.

14. The apparatus of claim 13, wherein the at least one processor is further configured to:
   determine that the BMC is in the protected mode when the BMC is upgrading firmware of one or more peripherals of a host computer managed by the BMC.

15. A non-transitory computer-readable medium storing computer executable code for operating a baseboard management controller (BMC), comprising code to:
   receive a first command;
   determine whether the BMC is in a protected mode for executing a protected process, wherein the protected process is updating firmware of the BMC;
   in response to a determination that the BMC is in the protected mode, determine whether the first command, when executed, interrupts the execution of the protected process, wherein to determine whether the first command interrupts, the code is further configured to:
      determine that the first command is a host power command directed to a host computer managed by the BMC;
      determine whether the BMC is actively communicating with the host computer, wherein the first command is determined to interrupt the execution of the protected process when the BMC is actively communicating with the host computer; and
   in response to a determination that the first command interrupts the execution of the protected process, discard the first command.

16. The non-transitory computer-readable medium of claim 15, wherein the code is further configured to:
   determine that the BMC is in the protected mode when the BMC is upgrading firmware of one or more peripherals of a host computer managed by the BMC.

* * * * *